United States Patent

Favret

[11] 3,836,004
[45] Sept. 17, 1974

[54] APPARATUS FOR RECOVERING OIL SUBSTANCES FROM THE SURFACE OF A BODY OF WATER

[76] Inventor: Uncas Favret, P.O. Box 73095, Metairie, La. 70003

[22] Filed: Dec. 7, 1972

[21] Appl. No.: 312,913

[52] U.S. Cl. .................. 210/242, 210/DIG. 21
[51] Int. Cl. ............................................ E02b 15/04
[58] Field of Search ............. 210/83, 242, DIG. 21; 114/104–107

[56] References Cited
UNITED STATES PATENTS

| | | | |
|---|---|---|---|
| 70,256 | 10/1867 | Peterson | 114/107 |
| 1,304,788 | 5/1919 | MacRae | 114/107 |
| 2,989,185 | 6/1961 | Lombardi | 210/242 X |
| 3,659,715 | 5/1972 | Shaler | 210/242 |
| 3,690,463 | 9/1972 | O'Brien | 210/DIG. 21 |
| 3,693,800 | 9/1972 | Spanfield et al. | 210/242 |
| 3,730,124 | 5/1973 | Britton | 114/106 |
| 3,753,496 | 8/1973 | Boyd | 210/DIG. 21 |

Primary Examiner—Theodore A. Granger
Attorney, Agent, or Firm—Burns, Doane, Swecker & Mathis

[57] ABSTRACT

A buoyant float disposed in a body of water carries oil inlet ports at a level to withdraw primarily oily substance floating on the surface. The ports are sized relative to the size of a communicating oil collection suction chamber so as to permit impeded flow into the chamber and to aid in creation of a vortex like effect tending to withdraw fluid with a heavy concentration of oil. A remote pump connected to a portion of the float provides suction sufficient to withdraw the oily substance from the collection chamber. Where wind may tend to displace the oily substance, a sail-like wind reaction surface which is attached to the float, carries the float, and its oil inlet ports, with the displaced oily substance. The oil inlet ports are disposed so as to be carried preferably above the water level so that in the absence of an upper layer of oily substances, only air is withdrawn.

20 Claims, 9 Drawing Figures

PATENTED SEP 17 1974 3,836,004

APPARATUS FOR RECOVERING OIL SUBSTANCES FROM THE SURFACE OF A BODY OF WATER

BACKGROUND OF THE INVENTION

This invention relates to apparatus for removing oily substances from the surface of a body of water. In particular, this invention is directed to the removal of an oil slick from a body of water wherein the oil slick is subject to movement across the surface of the water by wind and/or current forces.

In many manufacturing or production operations, oily substances are among the waste by-products which must be disposed of. These oily substances may comprise compounds such as mineral oils, animal fats and petroleum derivatives. The entire category of such waste substances, for the sake of convenience and not by way of limitation, may be referred to hereinafter as "oily substances" or simply "oil."

A variety of methods and apparatus exist for the recovery and disposal of these oils. For example, in some industries, settling ponds are utilized as a primary treating facility for oily waste water. Oily water is deposited into these ponds and is allowed to come to rest. Since oils have a lower specific gravity than water, oils will generally rise to the surface and accumulate in a film-like layer. This results in generally oil free water at the bottom of the settling pond and oil accumulated in the form of a "slick" or layer on the surface.

The successful use of these ponds requires that this oil, which has accumulated in a layer on the surface, be removed. It is the method and apparatus for removing this floating oil slick, especially in cases where the slick may be moved along the surface of the pond by wind, to which this invention is directed.

Presently, where the oil floating on the surface of the pond has a sufficiently high volatility, the oil is often disposed of by in-place burning, with the pond functioning as a burn pit. However, in addition to the usual hazards of fire, such practice generates large quantities of high density and noxious smoke. This smoke contaminates the air and, as a result, burning has become a generally undesirable method of removing the floating oil.

Skimmers have also been used to remove oily substances from the surface of ponds or other bodies of water where oil is confined by a natural or artifically constructed containment barriers. Some of the known skimming devices include "floating pumps" which utilize a pump and an engine or motor to drive the pump, both of which are mounted on a float or a buoy. Reference may be had to U.S. Pat. Nos. 3,547.553 and 3,598,501, respectively issued on Dec. 15, 1970 and Aug. 10, 1971, for disclosures of proposed devices of this type.

These floating pumps are intended to be disposed at a selected location in the water body and are then actuated. A conduit carries away the fluids withdrawn by the pump. Although devices of this type may be acceptable for some purposes they may not be totally desirable for a variety of reasons.

For example, these skimming devices may have a tendency to withdraw large quantities of water when operated to remove the oil floating on the pond. Of course, withdrawal of large quantities of water may necessitate large scale treatment facilities in conjunction with the pumping device to dispose of the oil. Thus, the oil-removing efficiency of these devices may be substantially reduced.

As may be noted, in the devices of each of the aforementioned patents, provision may be made for adjusting the relative position of the inlet for oil to be pumped and an oil layer. In one instance the level of the oil intake aperature of oil intake scoops may be selectively covered to control the depth of liquid skimmed. In another, the vertical relationship between the float and the upper end of a weir may be adjusted.

However, in each instance, the skimming is accomplished by fluid flow through a relatively unimpeded inlet as compared to the cross sectional area of the fluid collection region from which fluid is pumped. Thus, in the event of tipping or tilting of the device by reason of waves and/or wind action, water intake (rather than oil intake) into the collection region may freely take place.

Undesirable water intake may be further encountered where wind and/or current operates to displace the oil layer away from the skimming devices toward the water body containment barrier. Since the floating skimming device is essentially stationary, even if not necessarily anchored, the effectiveness of the device would require operator monitoring.

Moreover, if the oil escapes beyond a containment barrier by reason of a build up without operation of the skimming device, there may be undesirable environmental consequences.

It would, therefore, be desirable to provide a novel skimming apparatus and method wherein oil removal efficiency, measured in terms of low volume water removal, may be enhanced.

It would also be desirable to provide a novel skimming apparatus and method wherein skimming may take place without undue operator attention and on an essentially continuous basis.

Prior proposed skimming devices may also be undesirable from an economical standpoint by reason of the inclusion of the pump and its drive in the same floating apparatus. Selection of pump and motor equipment is thus somewhat limited. The weight of the overall entire apparatus which is buoyantly supported may also be excessive for this reason, thereby limiting the applications of the apparatus.

It would, therefore, be additionally desirable to provide a novel skimming apparatus and method wherein the selection of a pump and its drive is not as limited, and wherein multiple applications are facilitated by increasing portability of the equipment.

OBJECTS AND SUMMARY OF A PREFERRED EMBODIMENT OF THE INVENTION

It is, therefore, a general object of the present invention to provide an apparatus for recovering oily substances from the surface of a body of water intended to eliminate or minimize problems of the sort previously noted.

It is a more particular object of the present invention to provide a novel apparatus for recovering oily substances from the surface of a body of water, which apparatus removes primarily oily substances from the surface of the body of water and which is capable of travelling with an oily substance which is moved across the body of water by wind forces.

It is likewise an object of the present invention to provide a novel method and apparatus for skimming oily substance floating on the surface of a body of water on an essentially continuous basis without operator attention.

It is a further object of the present invention to provide a novel apparatus wherein multiple applications and portability are facilitated.

A preferred embodiment of a skimming apparatus for recovering oil floating on the surface of a body of water utilizes a buoyant saucer shaped float having a suction chamber disposed therein. The suction chamber functions also as a fluid collection chamber and is placed in communication with a remotely disposed, suitable continuously operating pump by means of a connecting hose.

A plurality of fluid inlet passages communicating with the suction chamber are carried by the saucer float. Each inlet passage is designed to permit impeded flow of fluid from an upper zone of the water body to the collection or suction chamber.

A rigid sail like structure is attached to the float which structure functions to define wind responsive reaction surface means operable to enable the float to travel with an oil accumulation where a wind tends to move the oil. In one embodiment the sail is comprised of an upright rectangular frustro-pyramid presenting symmetrically disposed wind reaction surfaces, so as to facilitate changes of the sailing float direction in response to wind direction changes. In another embodiment, this sail may function in parachute fashion and is rotatably mounted on the saucer float to aid in accomodating the directional response of the sailing float to changing wind directions.

The saucer float has a buoyancy and shape which permits it to float while allowing it to sink in upper oil layers. When the saucer floats on water in the absence of oil, mostly air is sucked into the fluid inlet passages. When there is a layer of oil floating on the surface of the water, the saucer continues to float on the water but sinks in the oil so that there is oil at the mouth of the appropriately disposed inlet passages. As a result, primarily oil is sucked into the inlet passages.

The oil passes along the inlet passages into the suction chamber, through the connecting hose, and into the pump. From the pump, the oil may be transported to a variety of storage or disposal facilities known to those skilled in this art.

THE DRAWINGS

Other objects and advantages of the present invention will become apparent with reference to the following detailed description of a preferred form thereof in conjunction with the accompanying drawings, in which like numerals indicate like members and in which.

DETAILED DESCRIPTION

Figure 1:
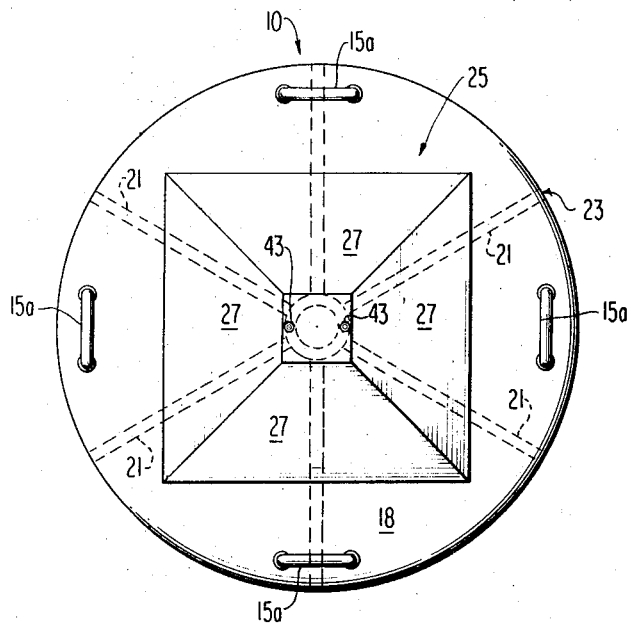
FIG. 1 is a top plan view of one embodiment of an oil recovery apparatus or skimmer according to the present invention.
Figure 2:
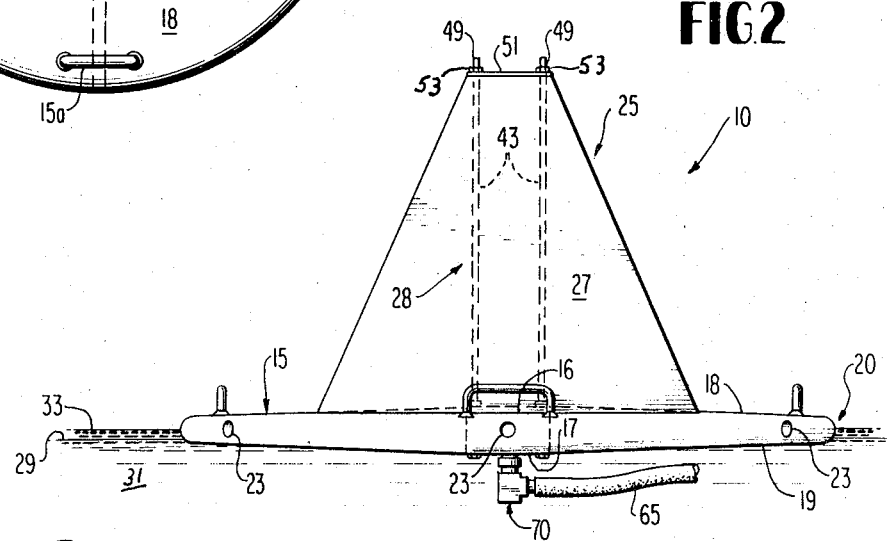
FIG. 2 is an elevational view of the skimmer of FIG. 1.

With reference to FIGS. 1 and 2, one form of an oil recovery or skimming apparatus 10 according to the present invention is there shown. A saucer or disc type float 15, having a pair of generally flat faces 16 and 17 substantially parallel to each other at a central location, is provided. A pair of inclined faces 18 and 19 contiguous with the flat faces 16 and 17 converge toward an outside periphery 20. Portability of the float 15, may be enhanced by the provision of suitably secured lifting handles 15a.

The saucer float 15 has a plurality of radially extending oil inlet passages 21. The radially extending oil inlet passages 21 terminate at oil inlet ports 23 along the outside periphery 20 of the saucer float 15.

In order to render the apparatus 10 responsive to wind force, a sail 25 may be mounted on the saucer float 15. The illustrated sail 25 of FIGS. 1 and 2 is comprised of four wind reaction faces 27 which form a generally frustro-pyramidal structure having an open bottom and upon which wind may act to displace the apparatus 10. The sail 25 is supported above the saucer float 15 by a mast assembly 28.

In FIG. 2, the oil recovery apparatus 10 may be seen floating on the surface 29 of a body of water 31. A layer of oil 33 is shown floating on the water surface 29.

With the skimming apparatus 10 in the posture depicted in FIG. 2, i.e., in the absence of substantial wave or other action causing tilting, the oil inlet passages 21 are disposed in a generally horizontal posture. (See also FIG. 4.) In other words, the passages 21 are generally perpendicular to a central axis of the skimming apparatus 10. Preferably, stability of the float 15 and thus stability of the orientation of the passages 21 is enhanced even in the presence of wind, wave and current forces by employing a suitably large diameter float 15. In this connection, a diameter of 3 to 5 feet may be advantageous.

Figure 4:
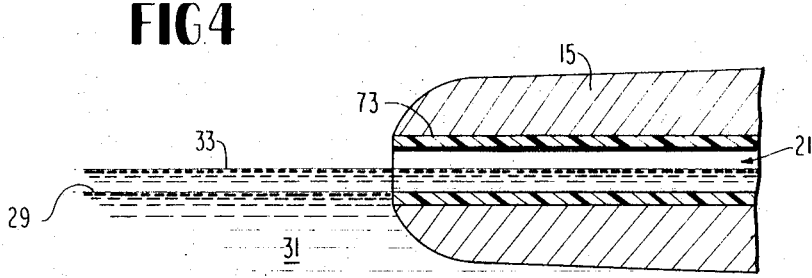
FIG. 4 is an enlarged sectional view of a saucer float according to the present invention.

In FIG. 4, it may be seen that the saucer float 15 has a bouyancy such that the skimming apparatus 10 floats in the body of water 31 with the surface 29 of the water at or slightly below the oil inlet port 23. However, the buoyancy of the saucer float 15 is such that the saucer float sinks in the layer of oil 33 with the result that oil appears at the oil inlet port 23. The saucer float 15 may be made from any material suitable to provide this desired buoyancy. For example, a wooden inner material with a fiberglass shell may be utilized.

The total weight of the float 15 is preferably in the range of 35 to 80 pounds. The sail and related mounting equipment is preferably of a weight in the range of three to 25 pounds.

If desired, air buoyancy chambers (not shown) may also be provided to produce the selected buoyancy.

Buoyancy and balance adjustment may also be provided by securing weights (not shown) to the float 15 at selected locations in any suitable manner.

Figure 3:
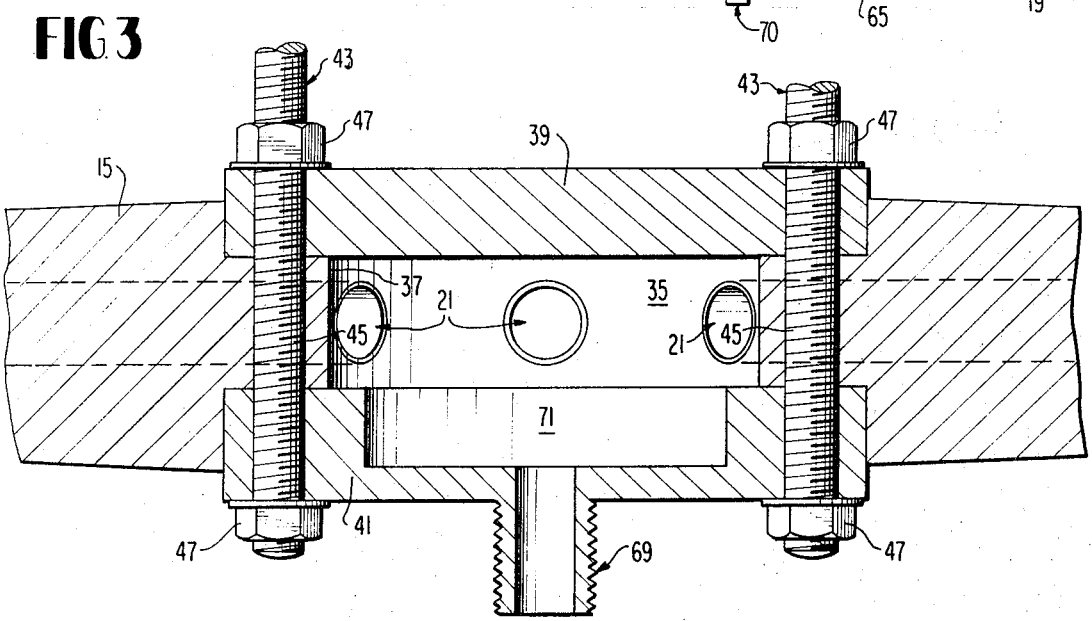
FIG. 3 is an enlarged sectional view of a portion of the apparatus shown in FIG. 2.

The generally horizontally disposed passages 21 terminated at a suction zone or chamber 35 defined within the interior of the oil recovery apparatus 10 as shown in FIG. 3. This suction chamber 35 is defined in part by an interior bulkhead 37 of the saucer float 15. An upper annular plate 39 and a lower annular plate 41 further define suction chamber 35.

The plates 39 and 41, which may be fabricated from any suitable material such as plastic or bronze, provide support for the mast assembly.

In this connection, it may be seen that the illustrated mast assembly 28 includes a plurality of circumferentially spaced rods 43, each having a theaded lower end portion 45. These threaded end portions are received in circumferentially spaced bores in the saucer float 15 adjacent and surrounding the suction chamber 35. Suitable securing means such as nuts 47 cooperable with the threaded lower portions 45 of the rods 43 provide for assembly and disassembly by the rods 43.

Each rod 43 also includes a threaded upper end portion 49 (FIG. 2) receivable in a lid member 51 of the sail 25. This lid member 51 may be constructed of fiberglass as may be the remainder of the sail 25 made up of the reaction faces 27. Suitable securing means such as nuts 53 cooperate with the upper threaded ends 49 of the rods 43 to maintain the sail 25 in assembled position.

As will be appreciated, this is accomplished by adjusting the nuts 53 so that the lid 51 bears down upon the portion of the sail 25 defining the wind responsive reaction faces 27. These substantially identically configured faces 27 may conveniently be integral with one another by molding the unit defining them as a one piece construction. Of course the bottom edge of the sail 25 defined by the open bottom frustro-pyramidical unit bears against the upper faces 16 and 18 of the saucer float 15 to complete the assembly.

Other means for securing the sail 25 to the float 15 may be employed. For example, the lower ends of the wind reaction faces 27 may be integrally provided with outwardly bent flanges (not shown) and these flanges may be directly bolted to the float 15, thereby dispensing with the need for a mast assembly or the like.

Figure 5:
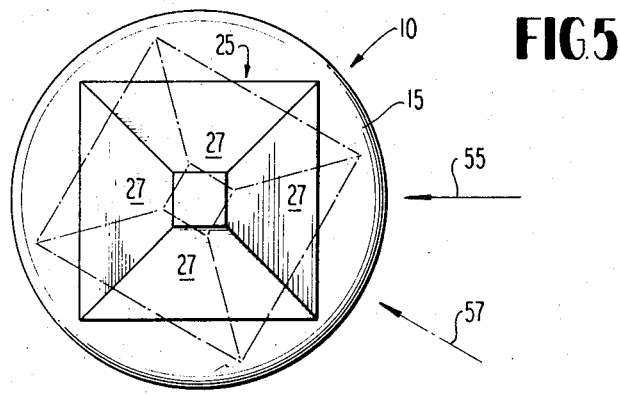
FIG. 5 is a top view of an oil recovery apparatus according to the present invention schematically showing in phantom a changed orientation of the sail as a result of a change in wind direction.

In FIG. 5, it may be seen that the sail 25 may align itself to move the skimming device 10 including the saucer float 15 in a direction responsive to wind coming from the direction, indicated by the arrow at 55, generally perpendicular to one reaction face 27. However, when the direction of the winds shifts to, say, that indicated by the arrow at 57, the sail 25 and the fixedly attached float 15 may rotate together about the central vertical axis of the float and align itself with the new direction 57 of the wind perpendicular to one reaction face 27 in order to carry the saucer float 15 with the wind.

As will be appreciated the wind force creates a turning moment by reacting with the sail faces 27 to accomplish such alignment. Thus, although saucer float 15 may be moving in a first direction responsive to wind coming from one direction 55, when the wind shifts to a new heading of, say, 57 the said 25 may responsively move the skimming apparatus 10 in the same direction which the accumulation of the oil will now be moving in response to the changed wind heading.

Figure 6:
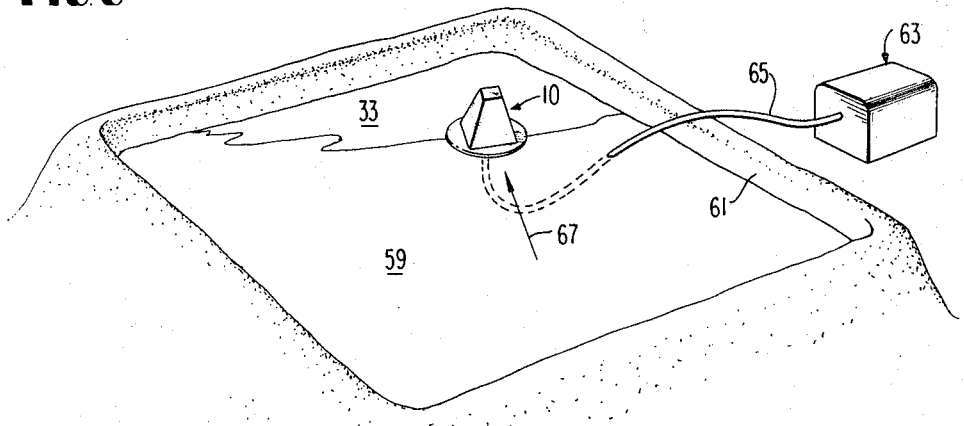
FIG. 6 is a perspective view of an oil recovery apparatus according to the present invention in an operational environment.

With reference to FIG. 6, the oil recovery apparatus 10 of the present invention may be seen disposed in a settling pond 59 peripherally bounded by a containment barrier 61. The oil recovery apparatus 10 is connected to a remotely disposed pump shown schematically at 63 by means of a suitable hose 65.

Preferably the hose is comprised of an oil resistant, flexible bouyant material capable of withstanding temperatures on the order of at least 150° F. In this connection polyvinylchloride may be a suitable material in that it enables the hose to float and permits transport of the oil, even if relatively hot; without deterioration or loss of flexibility.

The construction of the settling pond 59 is in accordance with practices known to those skilled in that art. An oil/water mixture may be introduced into the pond (by means not shown) and permitted to stand to provide sufficient retention time for the oil to rise to the water surface 29 and provide an upper oil layer 33. Wind coming from a direction indicated at 67 would tend to displace the accumulation of oil 33 toward a corner of the retaining wall or containment barrier 61 as shown. The sail 25 may, at the same time, responsively align itself with the wind coming from direction 67 and function to carry the oil recovery apparatus 10 into the corner of the pond 59 to which the oil is displaced. As a result, essentially continuous oil recovery may take place without operator intervention and regardless of the displacement of the accumulation of oil 33 caused by wind forces.

Advantageously oil recovery occurs at the location of highest oil layer depth since the wind tends to build up the oil layer adjacent the barrier 61, and, at the same time, tends to locate the apparatus 10 in the midst of the built up layer.

To accomplish oil recovery, the pump 63 produces suction in the hose 65 which in turn produces suction in the suction chamber 35. (See FIG. 3). The suction chamer 35 is placed in communication with the hose 65 by way of an externally threaded conduit 69 projecting downwardly from and integral with the bottom plate 41 bounding the suction chamer 35. This conduit 69 directly communicates with an internal depressed pocket 71 defined by the plate 51, with the pocket 71 forming a lower sump portion of the suction chamber 35.

During turning of the skimming apparatus 10, a swivel joint connection, indicated at 70 (FIG. 2), between the hose 65 and the conduit 69 minimizes or eliminates resistance to turning that might otherwise be present by reason of a hose connection.

In operation, oil from an oil layer 33 present at the mouths 27 of the fluid inlet passages 21 will flow naturally into the chamber 35, and will settle into the sump portion 71 thereof disposed slightly below the upper water surface 29. Suction supplied by the pump 63 through the hose 65 and the conduit 69 may aid in drawing the oil into the chamber 35. At any rate, the chamber 35 functions also as an oil collection chamber from which oil is withdrawn by suction so supplied by the pump 63.

Preferably, the pump 63 is a gas operated diaphragm pump that may function in a "dry" condition, i.e., without pumping fluid. Thus, the pump may be continuously operable, without operator attention, even at such times as the chamber 35 contains no liquid. At such times, air may be withdrawn by the pump without danger of damage through overheating. Generally, the pump may be operated in this continuous fashion at a realtively low volumetric displacement rate, e.g., 10 cubic feet per minute.

Although it will be appreciated that higher pumping rates and other size and type pumps may be employed, the use of low displacement rates does tend to minimize the intake of large amounts of water. Thus, the use of gas operated diaphragm pumps which do not require high volume flow to avoid overheating is particularly desirable.

The geometry of the oil travel path through the skimming apparatus is intended to minimize the amount of water that is withdrawn by the pump 63. As may be seen FIG. 4, each inlet passage 21 may be defined by a generally cylindrical plastic tube 73 received in bores in the float body 15. The cross sectional area through the flow path of each passage 21 is small compared with the cross sectional area through the flow path in the suction chamber 35, which latter area also exceeds the cross sectional flow path area of the exit conduit 69. In one form of the invention the tubes 73 and conduit 69 may have a flow path cross-sectional area of about one-half square inch while the cylindrical chamber 35 in the sump zone 71 has a cross-sectional area about 20 times greater.

Thus, each of the inlet passages 21 provides a degree of impedance to flow into the chamber 35. As such, in the event the float body undergoes transient tipping, whereby some of the passage mouths 23 become submerged below the oil layer 33, water flow into the chamber 35 will be somewhat impeded so that if the float body 15 rights itself soon, water intake by the pump 63 may be minimized.

It has also been found that the geometry of the oil travel path, including the smaller passage 21 leading to the larger chamber 35, aids in creating a vortex like effect at the mouths of the passages. Through the swirling so created by the suction, the upper layer of fluid is preferentially drawn into the chamber 35 even when the passages 21 may be partially submerged in water. Since the upper layer of fluid is more heavily concentrated with oil, efficiency is enhanced.

In addition, the disposition of the diametrically aligned sets of passages 21 generally perpendicular to the central axis of the float body 15 may advantageously avoid "scooping" of water during tipping.

Figure 7:
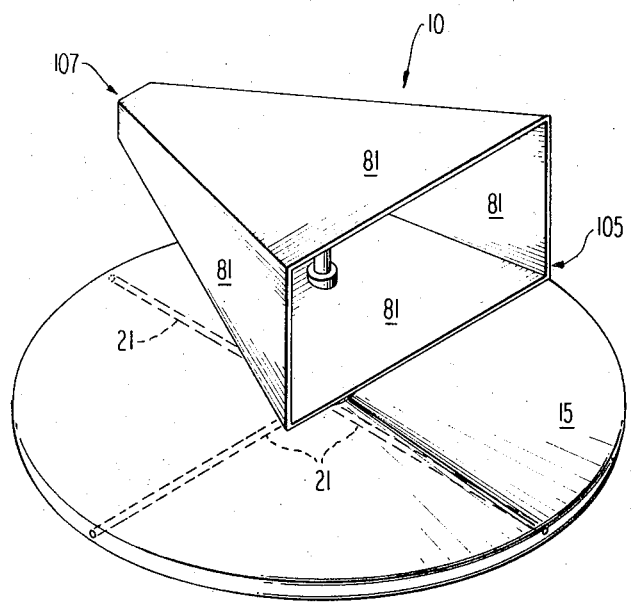
FIG. 7 is a perspective view of another embodiment of an oil recovery apparatus according to the present invention.
Figure 8:
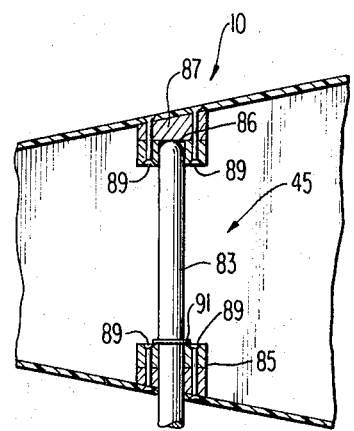
FIG. 8 is an elevational view partially in cross-section of the apparatus of FIG. 7.
Figure 9:
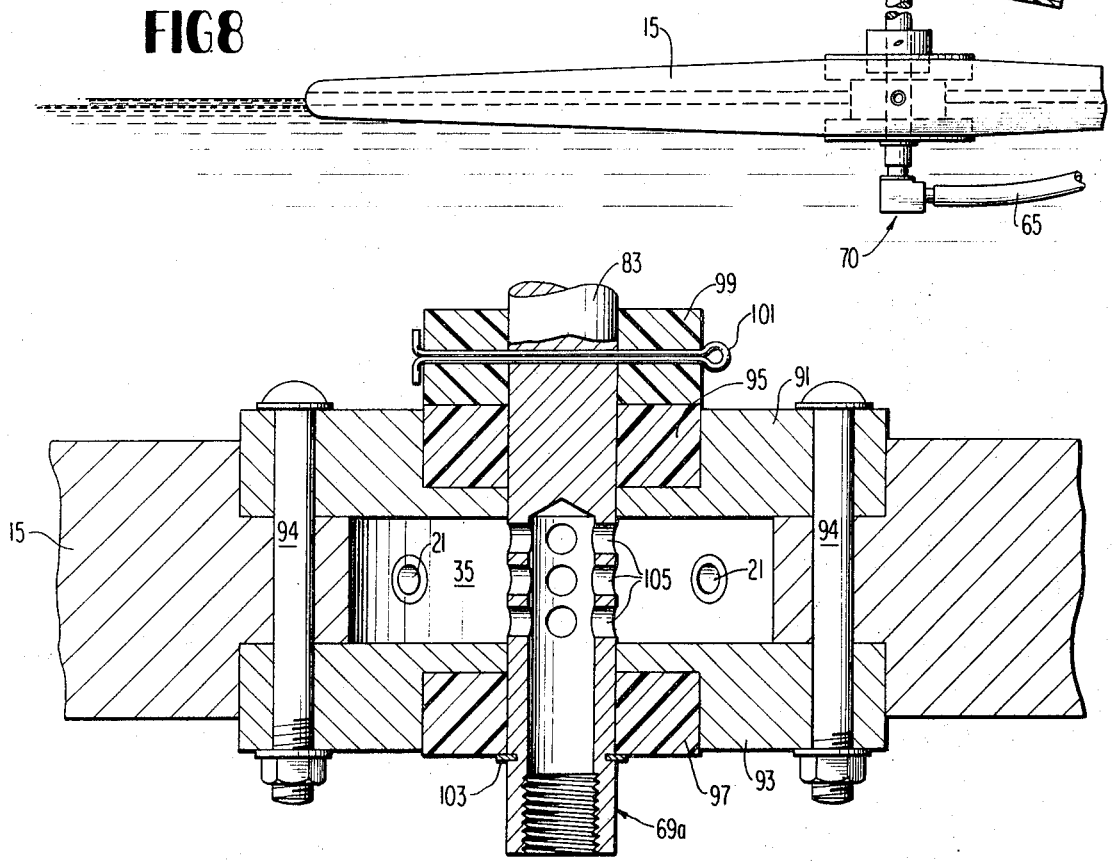
FIG. 9 is an enlarged sectional view of a portion of the apparatus shown in FIG. 8.

In FIGS. 7-9, a further form of the present invention may be seen. The skimming apparatus 10 of FIGS. 7-9 is constructed similarly to that of the previously described embodiment apart from the sail 25 and related structure. The function too is substantially the same, although movement of the float body 15 in response to changes in wind direction is intended to accomplished by rotation of the sail 25 relative to the float body.

The sail 25 is comprised of four faces 81 which form a generally frusto-pyramidal structure through which wind may pass. As may be seen in FIG. 7, the faces 81 are in symmetrically disposed pairs. The sail 35 is rotatably supported above the saucer float 15 by a mast assembly 45.

In FIG. 8, it may be seen that mast assembly comprises a rod 83 which passes through sleeve 85 into the interior of sail 25. This rod 83 is provided with a rounded upper end 86 which is frictionally seated in socket 87. Both the socket 87 and the sleeve 85 are attached to the sail 25 with bolts 89 or other conventional means known to those skilled in this art.

The sail 25 is prevented from moving upwards relative to the rod 83 by means of ring 91. This ring 91 cooperates with sleeve 85, and the upper rounded portion 86 of the rod 83 cooperates with the socket 87 in such a manner as to prevent axial movement of the sail 25 along the rod. However, the sail 25 is rotatable about the axis of rod 83 as will be hereinafter described in greater detail.

Affixed to the base of mast 45 is a swivel joint assembly 70 as in the previous embodiment. This assembly 70 may be fabricated from stainless steel or other suitable material. The swivel joint is operable to place an internally threaded conduit portion 69a at the lower end of the rod 83 in communication with a hose 65.

This hose 65 is in turn connected to a remotely disposed pump driven by a suitable drive.

Preferably the hose 65 of each embodiment is constructed of a generally light weight material, for example, plastic capable of floating in the body of water 31. A buoyant sleeve (not shown) may be placed around the hose to facilitate floating.

As shown in FIG. 9, an upper annular plate 91 and a lower annular plate 93 cooperate with the interior float bulkhead 37 to define the suction chamber 35. The plates 91, 93 may be suitably secured to the float body 15 as by bolts 94, and may be fabricated from a plastic material or a metal such as bronze. The plates also provide support for the rod 83. Each plate has a cup shaped recess receiving a bearing 95, 97.

It will, of course, be apparent that the plates and the bearings are arranged so as to prevent leakage of the suction in chamber 35 during operation of the apparatus.

Adjacent the upper bearing 95 and rotatable relative thereto is another bearing 99. This bearing 99 has an aperture passing through its diameter for receiving a cotter pin 101. The rod 83 also has a pin receiving hole which may be brought into positional agreement with the bearing aperture in order to permit the pin 101 to pass through both the bearing 99 and the rod 83.

The bearing 99 and the pin 101 cooperate with the bearing 95 to prevent downward axial movement of the rod 83 relative to the plates 91 and 93. A ring 103 is disposed in rod groove below the bearing 97 to prevent upward axial movement of the rod 83 relative to these plates.

Thus, it can be seen that whereas the rod 83 is prevented from moving axially with respect to saucer float 15, the rod 83 may rotate essentially freely on the bearing 99 about its central axis.

The conduit portion 69a of the rod passing through suction chamber 35 includes a plurality of entrance apertures 105. These apertures 105 provide an oil outlet from suction chamber 35 by permitting liquid in the suction chamber to pass into the conduit portion 69a of the rod 83, which portion 69a is in fluid communication with the hose 65.

The function of the oil inlet passages 21 and the suction or collection chamber 35 is similar to that described in connection with FIGS. 1-6. However, the sail 25 functions in parachute fashion by the inner walls thereof constituting reaction surfaces cooperable with wind passing through the enlarged opened end 105 (FIG. 7).

It is contemplated that rotating orientation of the sail to bring that enlarged opening into facing wind relationship, in response to wind direction changes, might be enhanced by weighting the sail in a manner similar to a weathervane, so that the smaller opened end 107 (FIG. 8) will tend to move downwind. Upon such orientation, the generally rigid, rotatable sail 25 will carry the oil recovery apparatus 10 in the same direction in which the oil layer will be carried so that oil may be continuously recovered.

SUMMARY OF ADVANTAGES

It will be appreciated that in recovering oily substances floating on a body of water according to the present invention, certain significant advantages are provided.

In particular, the recovery of oil floating on the surface of a body of water may be carried out regardless of the direction of the wind acting on oil floating on the body of water. This enables oil recovery to take place without operator intervention more efficiently than with essentially stationary prior art devices. The saucer float sails with the moving oil and the apparatus does not have to wait for an oil accumulation to randomly pass nearby to affect oil recovery. By "stalking" the oil accumulation as it moves, oil recovery may be continuous.

In this connection, it is envisioned that in environments where current tending to displace oil would be of a magnitude to significantly control oil movement, stalking and other advantages of the present invention may be realized without a sail since the float 15 would be displaced by current with the oil.

Also important is the fact that an apparatus according to the present invention may withdraw proportionately less water and more oil than conventional devices.

The portability of the apparatus and weight advantages provided by remote location of the pump and its drive are also significant.

In this connection, it may be noted that variety in pump selection is also provided, and the use of a self-priming pump is enabled.

In describing the present invention, reference has been made to preferred forms thereof. However, those skilled in the art and familiar with the disclosure of the present invention may recognize additions, deletions, substitutions or other modifications which would fall within the spirit and scope of the invention as defined in the claims.

What is claimed is:

1. Apparatus for removing oily substance floating on a body of water through a hose, said apparatus comprising:
    bouyant float means for floating on the surface of a body of water;
    oil withdrawal means, including oil inlet means carried by said buoyant float means, for withdrawing oily substance floating on the body of water;
    said buoyant float means being operable to buoyantly support said oil inlet means at a level communicable with the oily substance floating on the body of water;
    wind reaction surface means, supported by said buoyant float means responsive to wind tending to displace an oily substance floating on a body of water for moving said buoyant float means in the direction of the displaced oily substance, said wind reaction surface means comprising a plurality of symmetrically opposed pairs of planar surfaces supported by said float means and spaced above the upper surface thereof; and
    said oil withdrawal means further comprising swivel joint means for rotatably attaching a hose to said buoyant float means to reduce a resistance to a turning of said buoyant float means when said buoyant float means is moved in the direction of the displaced oily substance.

2. Apparatus for removing oily substance floating on a body of water according to claim 1 wherein:
    said buoyant float means comprises a generally disc-shaped float body;
    said float having a pair of substantially opposed inclined faces extending from a central portion thereof and converging at an outer periphery of said float body.

3. Apparatus according to claim 1 wherein:
    said wind reaction surface means comprises a generally frusto-pyramical structure fixedly mounted on said float means in a generally upright position and including generally symmetrically disposed wind reaction faces.

4. Apparatus according to claim 1 wherein:
    said wind reaction means is rotatably supported on said float means and is operable to rotate in response to changes in wind direction.

5. Apparatus for removing oily substance from the surface of a body of water according to claim 1 wherein:
    said wind reaction surface means comprises a rigid open ended generally frusto-pyramidal body orientable in response to changes in wind direction to direct wind through said rigid body to move said buoyant float means with the wind.

6. Apparatus according to claim 1 wherein:
    said oil withdrawal means includes an oil collection chamber having a first cross-sectional area carried by said float means, and wherein
    said oil inlet means comprises a plurality of inlet passage means each having a cross-sectional area less than said first cross-sectional area for providing a vortex-like flow of fluid at a mouth of said oil inlet means when said mouth is below the surface of a body of water.

7. Apparatus according to claim 6 wherein:
    said inlet passage means are disposed generally perpendicular to a central axis of said float means.

8. Apparatus for recovering oily substances from the surface of a body of water according to claim 1 wherein said wind reaction surface means is connected to said buoyant float means by an assembly comprising:
    a mast;
    a first and second mast support means connected to said float means for supporting said mast;
    bearing means adjacent said mast support means for rotatably carrying said mast;
    said first and second mast support means being in spaced apart relationship to form with an interior wall of said float means and said mast an oil collection a chamber; and
    means for placing an interior portion of said mast in fluid communication with said chamber.

9. Apparatus for recovering oily substance from the surface of a body of water according to claim 1 wherein said apparatus further comprises:
    interior wall means of said buoyant float means defining a suction chamber; and a plurality of oil inlet passages passing through said wall means to place said suction chamber in fluid communication with said oil inlet means.

10. Apparatus for removing oily substance floating on a body of water, said apparatus comprising:
buoyant float means for floating on the surface of a body of water;
oil withdrawal means, including oil inlet means carried by said buoyant float means, for withdrawing oily substance floating on the body of water;
said buoyant float means being operable to buoyantly support said oil inlet means at a level communicable with the oily substance floating on the body of water; and
wind reaction surface means, connected to said buoyant float means and responsive to wind tending to displace an oily substance floating on a body of water, for moving said buoyant float means in the direction of the displaced oily substance,
said wind reaction surface means comprising a generally frusto-pyramidal structure fixedly mounted on said float means above the surface thereof in a generally upright position and including generally symmetrically disposed wind reaction faces.

11. Apparatus for removing oily substance floating on a body of water according to claim 10 wherein:
said buoyant float means comprises a generally disc-shaped float body;
said float having a pair of substantially opposed inclined faces extending from a central portion thereof and converging at an outer periphery of said float body.

12. Apparatus according to claim 10 wherein:
said oil withdrawal means includes an oil collection chamber having a first cross-sectional area carried by said float means, and wherein
said oil inlet means comprises a plurality of inlet passage means each having a cross-sectional area less than said first cross-sectional area for providing a vortex-like flow of fluid at a mouth of said oil inlet means when said mouth is below the surface of a body of water.

13. Apparatus according to claim 10 wherein:
said inlet passage means are disposed generally perpendicular to a central axis of said float means.

14. Apparatus for recovering oily substance from the surface of a body of water according to claim 10 wherein said apparatus further comprises:
interior wall means of said buoyant float means defining a suction chamber; and
a plurality of oil inlet passages passing through said wall means to place said suction chamber in fluid communication with said oil inlet means.

15. Apparatus for removing oily substance floating on a body of water through a hose, said apparatus comprising:
buoyant float means for floating on the surface of a body of water;
oil withdrawal means, including oil inlet means carried by said buoyant float means, for withdrawing oily substance floating on the body of water;
said buoyant float means being operable to buoyantly support said oil inlet means at a level communicable with the oily substance floating on the body of water; and
wind reaction surface means, connected to said buoyant float means and responsive to wind tending to displace an oil substance floating on a body of water, for moving said
buoyant float means in the direction of the displaced oily substance,
said wind reaction surface means comprising a rigid, generally frusto-pyramidal body with open ends at each end of its longitudinal axis. said axis being supported for rotatable movement around a vertical axis supported by said float means above an upper surface thereof whereby said frusto-pyramidal body rotates responsively to changes in wind direction to direct wind through the interior of said frusto-pyramidal body to move said buoyant float means by said wind.

16. Apparatus for removing oily substance floating on a body of water according to claim 15 wherein:
said buoyant float means comprises a generally disc-shaped float body;
said float having a pair of substantially opposed inclined faces extending from a central portion thereof and converging at an outer periphery of said float body.

17. Apparatus according to claim 15 wherein:
said oil withdrawal means includes an oil collection chamber carried by said float means, and wherein
said oil inlet means comprises a plurality of inlet passage means for providing impeded flow of fluid therethrough to said collection chamber.

18. Apparatus according to claim 15 wherein:
said inlet passage means are disposed generally perpendicular to a central axis of said float means.

19. Apparatus for recovering oily substance from the surface of a body of water according to claim 15 wherein said apparatus further comprises:
interior wall means of said buoyant float means defining a suction chamber; and
a plurality of oil inlet passages passing through said wall means to place said suction chamber in fluid communication with said oil inlet means.

20. Apparatus according to claim 15 and wherein:
said oil withdrawal means further comprises swivel joint means for rotatably attaching a hose to said buoyant float means to reduce a resistance to a turning of said buoyant float means when said buoyant float means is moved in the direction of the displaced oily substance.

* * * * *